United States Patent
Chang et al.

(10) Patent No.: US 12,006,738 B2
(45) Date of Patent: Jun. 11, 2024

(54) EXTENSION DEVICE AND ELECTRONIC SYSTEM

(71) Applicant: PEGATRON CORPORATION, Taipei (TW)

(72) Inventors: Chun-Fu Chang, Taipei (TW); I-Tien Hsieh, Taipei (TW); Hui-Chen Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 346 days.

(21) Appl. No.: 17/486,404

(22) Filed: Sep. 27, 2021

(65) Prior Publication Data

US 2022/0207195 A1   Jun. 30, 2022

(30) Foreign Application Priority Data

Dec. 24, 2020   (TW) .................. 109146077

(51) Int. Cl.
| | | |
|---|---|---|
| *E05B 73/00* | (2006.01) | |
| *G06F 1/16* | (2006.01) | |
| *G06F 21/88* | (2013.01) | |

(52) U.S. Cl.
CPC ........ *E05B 73/0082* (2013.01); *G06F 1/1632* (2013.01); *G06F 1/1654* (2013.01); *G06F 1/1669* (2013.01); *E05B 2073/0088* (2013.01); *G06F 21/88* (2013.01)

(58) Field of Classification Search
CPC ......... E05B 73/0082; E05B 2073/0088; G06F 1/1669; G06F 1/1654; G06F 1/1632
See application file for complete search history.

(56) References Cited

U.S. PATENT DOCUMENTS

| | | | | | |
|---|---|---|---|---|---|
| 5,870,283 | A | * | 2/1999 | Maeda .................. | G06F 1/1632 361/679.44 |
| 6,236,571 | B1 | * | 5/2001 | Dohi ..................... | G06F 1/1632 361/679.45 |
| 6,275,378 | B1 | * | 8/2001 | Lee ..................... | E05B 73/0082 361/679.55 |

(Continued)

FOREIGN PATENT DOCUMENTS

| | | |
|---|---|---|
| CN | 100573411 | 12/2009 |
| TW | 515530 | 1/2016 |

(Continued)

*Primary Examiner* — Nidhi Thaker
(74) *Attorney, Agent, or Firm* — J.C. PATENTS

(57) ABSTRACT

An extension device, including a connecting base and an anti-theft lock assembly, is provided. The connecting base includes a housing, a first moving member, a fixed member, and a second moving member. The fixed member is disposed at one side of the housing and includes a lock hole. The second moving member is movably disposed between the first moving member and the fixed member. The anti-theft lock assembly is detachably disposed at one side of the fixed member opposite to the second moving member. The anti-theft lock assembly is adapted to pass through the lock hole of the fixed member and push against the second moving member, so that the second moving member abuts against the first moving member to stop the first moving member at a buckling position. In addition, an electronic system, including the extension device, is also provided.

14 Claims, 5 Drawing Sheets

(56) References Cited

U.S. PATENT DOCUMENTS

| | | | | |
|---|---|---|---|---|
| 9,013,868 | B2 * | 4/2015 | Kuo | G06F 1/1632 |
| | | | | 361/679.44 |
| 9,077,095 | B2 * | 7/2015 | Lin | H01R 13/42 |
| 9,141,146 | B2 * | 9/2015 | Ke | G06F 1/1679 |
| 9,398,707 | B2 * | 7/2016 | Chang | G06F 1/1681 |
| 10,067,533 | B1 * | 9/2018 | Powell | G06F 1/1679 |
| 10,437,291 | B2 * | 10/2019 | Hsu | G06F 1/1654 |
| 11,735,861 | B2 * | 8/2023 | Chang | G06F 1/1632 |
| | | | | 439/347 |
| 2009/0140618 | A1 * | 6/2009 | Kodaira | G06F 1/1635 |
| | | | | 312/223.6 |
| 2011/0038107 | A1 * | 2/2011 | Hsiu | G05G 5/005 |
| | | | | 361/679.01 |
| 2012/0212910 | A1 * | 8/2012 | Katsuta | G06F 1/1616 |
| | | | | 361/747 |
| 2014/0355196 | A1 * | 12/2014 | Hashimoto | G06F 1/1632 |
| | | | | 248/346.03 |
| 2016/0292463 | A1 * | 10/2016 | Moore | G06F 21/88 |
| 2019/0369666 | A1 * | 12/2019 | Mori | G06F 1/1632 |
| 2021/0148142 | A1 * | 5/2021 | Klinkman | E05B 73/0082 |
| 2023/0026242 | A1 * | 1/2023 | Chang | G06F 1/1662 |

FOREIGN PATENT DOCUMENTS

| | | | | |
|---|---|---|---|---|
| TW | | I519932 | 2/2016 | |
| TW | | I551764 | 10/2016 | |
| WO | WO-2015076848 | A1 * | 5/2015 | ......... E05B 17/2023 |
| WO | | 2018155365 | 8/2018 | |

\* cited by examiner

EXTENSION DEVICE AND ELECTRONIC SYSTEM

CROSS-REFERENCE TO RELATED APPLICATION

This application claims the priority benefit of Taiwan application serial no. 109146077, filed on Dec. 24, 2020. The entirety of the above-mentioned patent application is hereby incorporated by reference herein and made a part of this specification.

BACKGROUND

Technical Field

The disclosure relates to an extension device and an electronic system, and more particularly to an extension device capable of anti-theft and an electronic system applying the extension device.

Description of Related Art

With the increasing advancement of tablet computer technology in recent years, more and more people are using tablet computers instead of notebook computers. In order for the input of the tablet computer to be faster and more convenient, the external keyboard of the tablet computer has been developed accordingly.

Generally, in anti-theft devices commonly used for tablet computers in shopping malls, anti-theft locks are usually fixed on the tablet computers. Since the external keyboard and the tablet computer are detachable, the external keyboard cannot be protected by only locking the tablet computer. However, if another lock is disposed to fix the external keyboard or another structure is disposed to fix the connection between the tablet computer and the external keyboard, the structure will be complicated and unnecessary cost will be increased.

SUMMARY

The disclosure provides an extension device, which is adapted to be assembled with an electronic device, and provides an anti-theft lock assembly to limit the electronic device to the extension device, thereby implementing the locking between the extension device and the electronic device.

The disclosure provides an electronic system, which has the extension device.

The disclosure provides an extension device, which includes a connecting base and an anti-theft lock assembly. The connecting base includes a housing, a first moving member, a fixed member, and a second moving member. The first moving member disposed at the housing and is capable of moving back and forth along a direction to be located at a buckling position or a releasing position. The fixed member is disposed at one side of the housing and includes a lock hole. The second moving member is movably disposed between the first moving member and the fixed member. The anti-theft lock assembly is detachably disposed at one side of the fixed member opposite to the second moving member. The anti-theft lock assembly is adapted to pass through the lock hole of the fixed member and push against the second moving member, so that the second moving member abuts against the first moving member to stop the first moving member at the buckling position.

The disclosure provides an electronic system, which includes an electronic device and an extension device. The electronic device includes a buckle groove. The extension device includes a connecting base and an anti-theft lock assembly. The connecting base includes a housing, a first moving member, a fixed member, and a second moving member. The first moving member is disposed at the housing and is capable of moving back and forth along a direction to be located at a buckling position or a releasing position. The first moving member includes a main body and a hook extending from the main body and exposed outside the housing. The hook is disposed corresponding to the buckle groove of the electronic device, so that the electronic device is engaged with the buckle groove by the hook to be assembled to the connecting base. The fixed member is disposed at one side of the housing and includes a lock hole. The second moving member is movably disposed between the main body and the fixed member. The anti-theft lock assembly is detachably disposed at one side of the fixed member opposite to the second moving member. When the electronic device is assembled to the connecting base and the hook is located at the buckling position, the anti-theft lock assembly is adapted to pass through the lock hole of the fixed member and push against the second moving member, so that the second moving member abuts against the main body to stop the first moving member at the buckling position.

In an embodiment of the disclosure, the connecting base further includes a first elastic member. One end of the first elastic member is disposed at the housing, and other end of the first elastic member is disposed at the first moving member, so as to generate an elastic force when the first moving member is located at the releasing position for the first moving member to reset to the buckling position.

In an embodiment of the disclosure, the connecting base further includes a second elastic member. One end of the second elastic member is disposed at the housing, and other end of the second elastic member is disposed at the second moving member. The second elastic member provides an elastic potential energy for the second moving member to reset when the second moving member is pushed to the first moving member.

In an embodiment of the disclosure, the hook includes a first limiting surface. The electronic device further comprises a positioning hole, and the connecting base further includes a positioning member protruding from the housing. When the electronic device is close to the connecting base, the positioning member extends into the positioning hole of the electronic device. The positioning member includes a second limiting surface and a third limiting surface opposite to each other. A normal direction of the second limiting surface and the third limiting surface is different from a normal direction of the first limiting surface.

In an embodiment of the disclosure, a top portion of the hook includes an inclined surface. When the electronic device is close to the connecting base, the electronic device pushes against the hook along the inclined surface, so that the first moving member moves along the direction.

In an embodiment of the disclosure, one end of the anti-theft lock assembly includes a locking member. The locking member is adapted to pass through the fixed member in a shape aligned with the lock hole and then rotate by an angle to displace from the lock hole to be fixed to the fixed member.

Based on the above, in the extension device of the disclosure, the anti-theft lock assembly is adapted to pass through the lock hole of the fixed member and push against the second moving member, so that the second moving member abuts against the first moving member to stop the first moving member from at the buckling position. In this way, the anti-theft lock assembly may be fixed to the extension device and limit the electronic device onto the extension device, thereby achieving the anti-theft function.

In order for the features and advantages of the disclosure to be more comprehensible, the following specific embodiments are described in detail in conjunction with the accompanying drawings.

DETAILED DESCRIPTION OF DISCLOSED EMBODIMENTS

Figure 1:
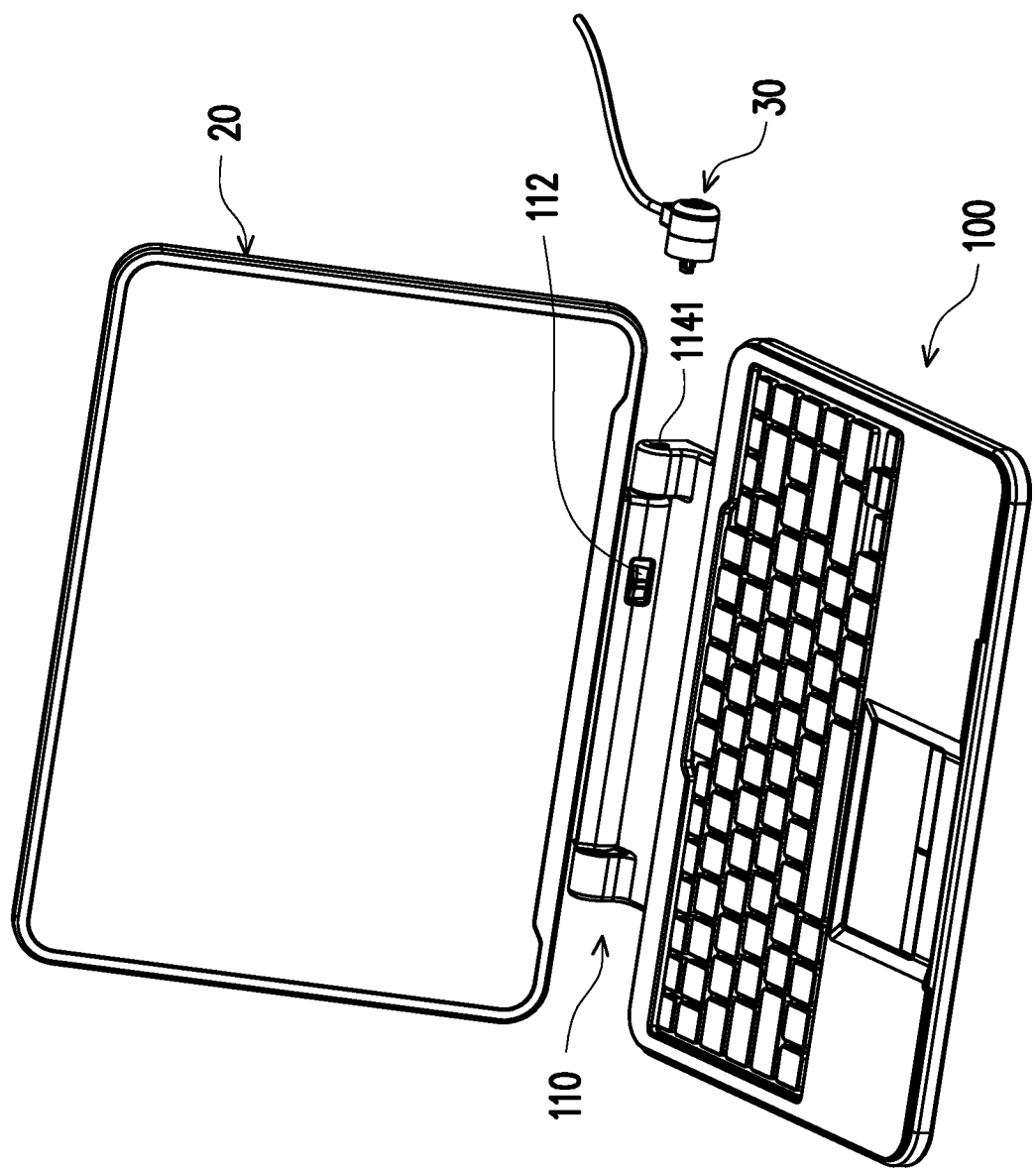
FIG. 1 is a perspective view of an electronic system according to an embodiment of the disclosure.
Figure 2:
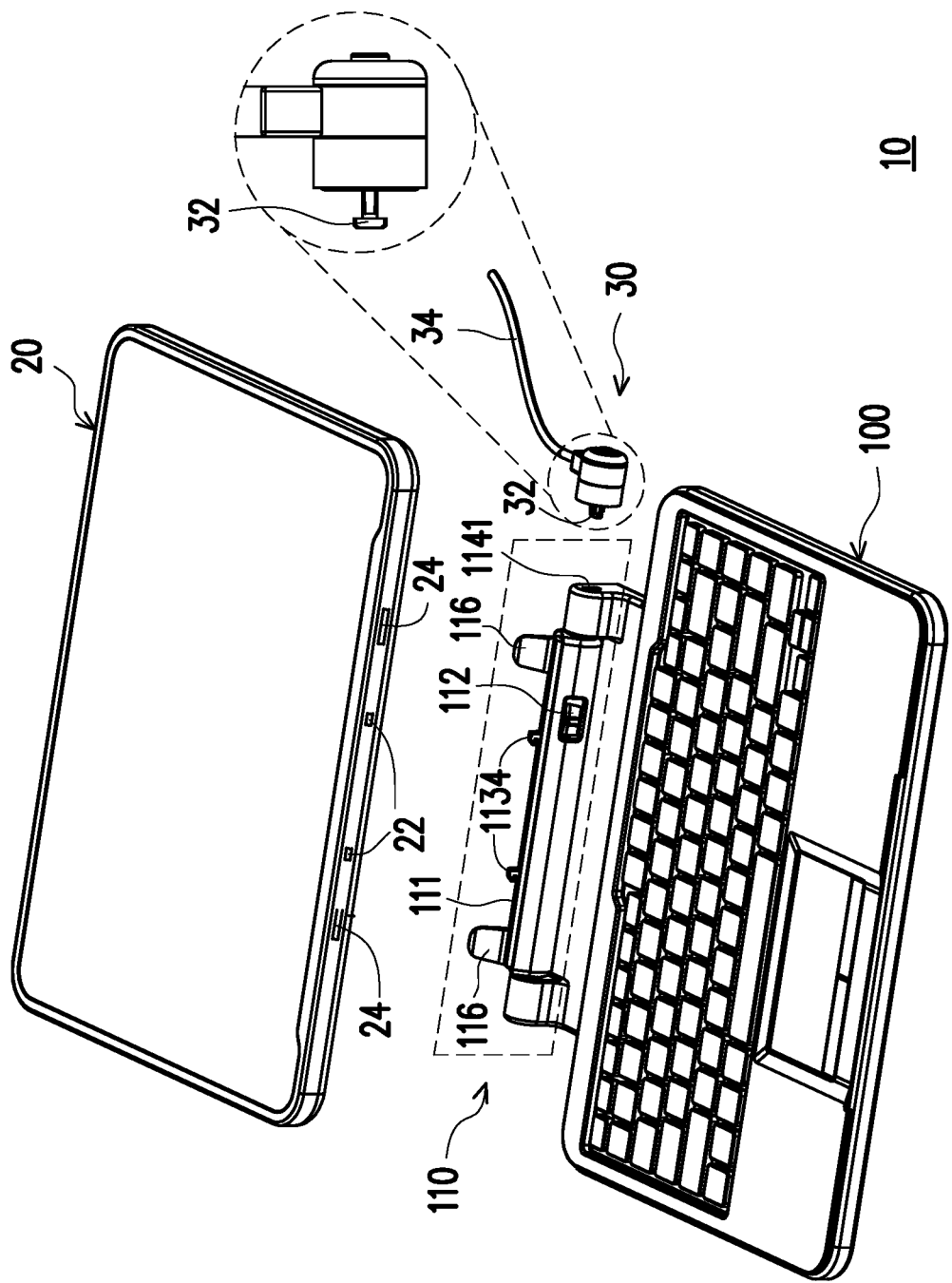
FIG. 2 is an exploded view of the electronic system of FIG. 1.

FIG. 1 is a perspective view of an electronic system according to an embodiment of the disclosure. FIG. 2 is an exploded view of the electronic system of FIG. 1. Please refer to FIG. 1 and FIG. 2. An electronic system 10 of the embodiment includes an electronic device 20 and an extension device 100. The electronic device 20 is detachably disposed at the extension device 100. The electronic device 20 is, for example, a tablet computer, and the extension device 100 is, for example, an external keyboard, but the types of the electronic device 20 and the extension device 100 are not limited thereto. In other embodiments, the electronic device 20 may also be a mobile phone, and the extension device 100 may also be a speaker, etc.

In the embodiment, when the electronic device 20 is installed on the extension device 100, an anti-theft lock assembly 30 may be fixed to the extension device 100 and limit the electronic device 20 onto the extension device 100 to achieve the anti-theft effect, which will be explained below.

Figure 3:
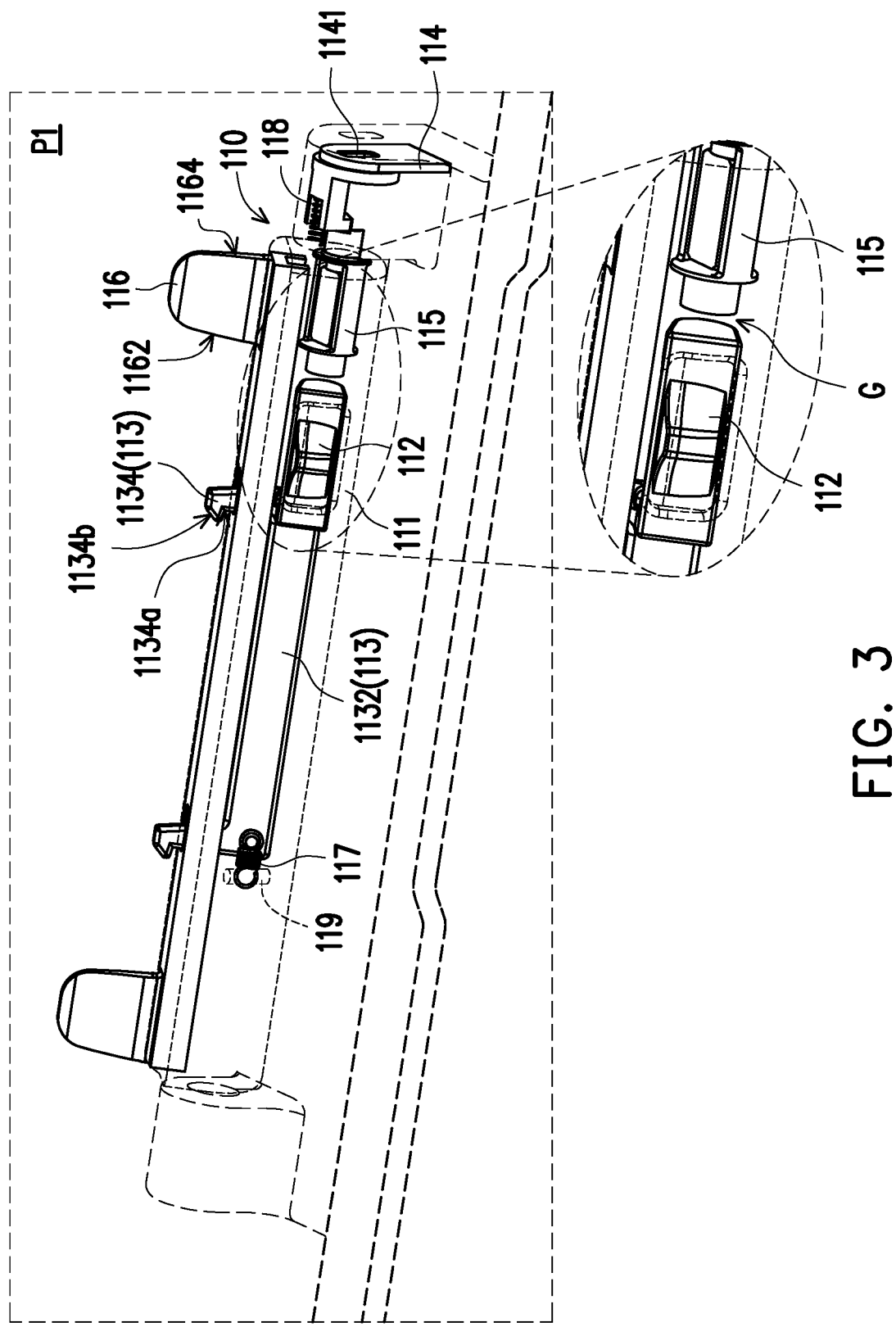
FIG. 3 is a partial enlarged schematic view of FIG. 2.

FIG. 3 is a partial enlarged schematic view of FIG. 2. It should be noted that in order to clearly show the internal structure of the extension device 100, a housing 111 of the extension device 100 is particularly represented by dotted lines.

Please refer to FIG. 2 and FIG. 3. In the embodiment, the extension device 100 includes a connecting base 110 and the anti-theft lock assembly 30. The extension device 100 is used to assemble the electronic device 20. The connecting base 110 includes the housing 111, a first moving member 113, a fixed member 114, and a second moving member 115. In the embodiment, the connecting base 110 further includes a toggle 112. The toggle 112 is movably disposed at the housing 111, and a portion of the toggle 112 is exposed outside the housing 111 for the user to operate the toggle 112.

The first moving member 113 is disposed at the housing 111 and can move back and forth along a direction D1 to be located at a buckling position or a releasing position. The buckling position may be the position where the first moving member 113 is located in a first position P1 shown in FIG. 3, and the releasing position may be the position where the first moving member 113 is located in a second position P2 shown in FIG. 4. The first moving member 113 includes a main body 1132 located in the housing 111 and a hook 1134 extending from the main body 1132 and exposed outside the housing 111. The main body 1132 of the first moving member 113 is linked to the toggle 112 in the direction D1 (labelled in FIG. 4), and the hook 1134 is used to engage to a hook groove 22 of the electronic device 20. The fixed member 114 is disposed at one side of the housing 111 and includes a lock hole 1141. The second moving member 115 is movably disposed between the main body 1132 and the fixed member 114.

In the embodiment, the connecting base 110 further includes a positioning member 116 protruding from the housing 111. When the electronic device 20 is disposed at the connecting base 110 of the extension device 100, the positioning member 116 extends into a positioning hole 24 (FIG. 2) of the electronic device 20.

The hook 1134 includes a first limiting surface 1134a. The positioning member 116 includes a second limiting surface 1162 and a third limiting surface 1164 opposite to each other. A normal direction of the second limiting surface 1162 and the third limiting surface 1164 is different from a normal direction of the first limiting surface 1134a to provide limit in different directions.

For example, in the embodiment, the first limiting surface 1134a is used to limit the electronic device 20 from being pulled out of the extension device 100 upward. The second limiting surface 1162 and the third limiting surface 1164 are used to limit the electronic device 20 from moving left and right relative to the extension device 100.

In the embodiment, the first position P1 shown in FIG. 3 is the position of the connecting base 110 under normal condition. At this time, the first moving member 113 is located at the buckling position, and a gap G is presented between the second moving member 115 and the main body 1132 to provide space for the main body 1132 to move toward the direction of the second moving member 115.

In the embodiment, the toggle 112 is linked to the first moving member 113 in the direction D1, and the moving distance of the first moving member 113 (that is, the distance moved by the first moving member 113 between the buckling position and the releasing position) is equal to the gap G between the main body 1132 and the second moving member 115 in the state of the first position P1 as shown in FIG. 3.

Figure 4:
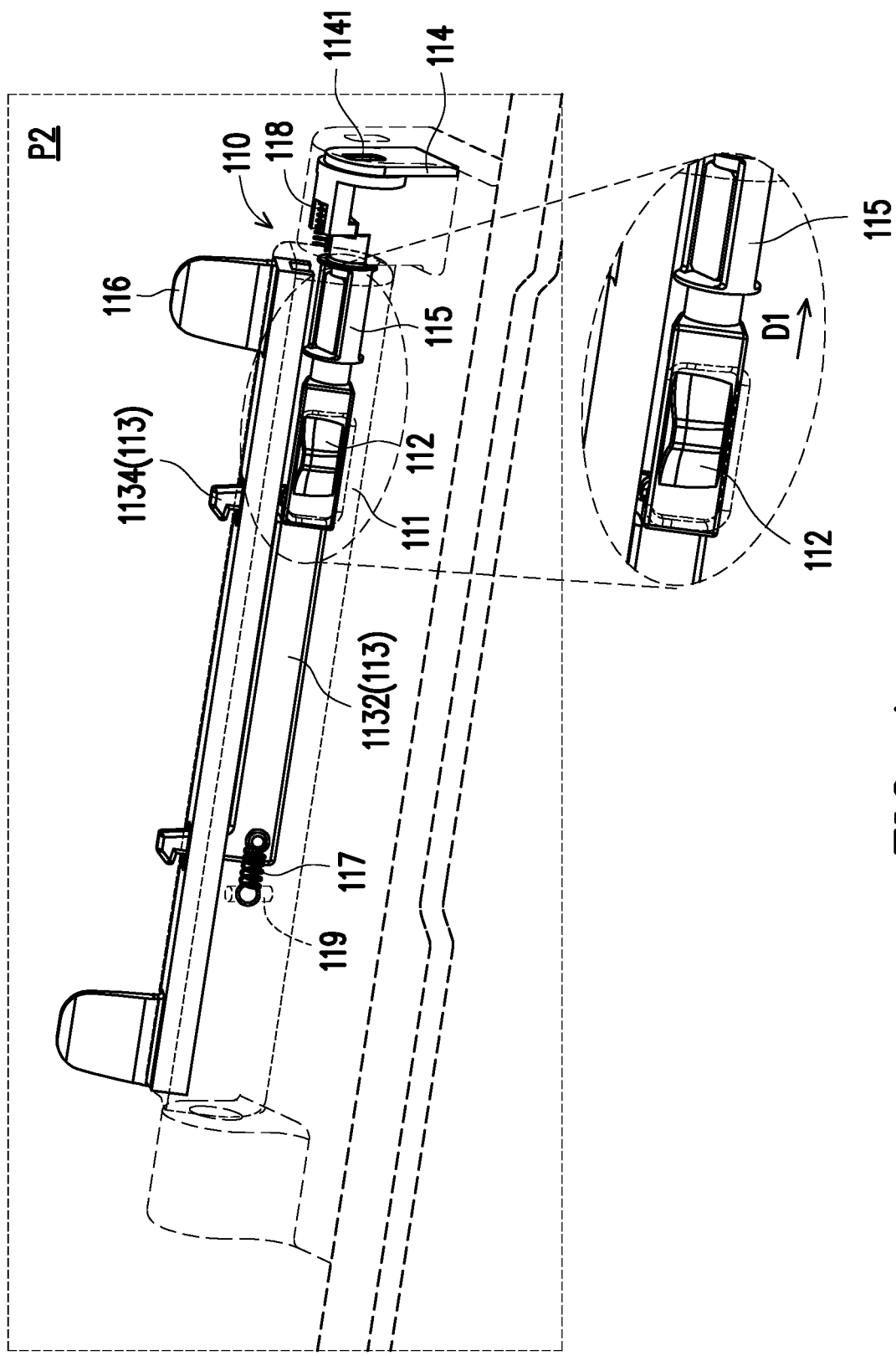
FIG. 4 is a partial schematic view of an extension device of FIG. 1 in a second position.

FIG. 4 is a partial schematic view of the extension device of FIG. 1 in the second position P2. In the second position P2 shown in FIG. 4, the first moving member 113 is located at the releasing position. Please refer to FIG. 3 and FIG. 4, the user may pull the toggle 112 to move the toggle 112 along the direction D1 toward the second moving member 115, so that the hook 1134 moves to the releasing position. In other words, the main body 1132 drives the hook 1134 to move along the direction D1 toward the second moving member 115, so that the first moving member 113 moves to the releasing position.

When the user intends to combine the electronic device 20 with the extension device 100, the electronic device 20 may be assembled close to the connecting base 110 from the top of the extension device 100 downward. Please refer to FIG. 2 to FIG. 4. Specifically, a top portion of the hook 1134 includes an inclined surface 1134b. During the process of assembling the electronic device 20 to the connecting base 110 to be close to the housing 111, a bottom surface of the electronic device 20 next to the hook groove 22 (as shown in FIG. 2) contacts the inclined surface 1134b of the hook

1134. As the electronic device 20 continues to move downward, the electronic device 20 pushes the hook 1134 along the inclined surface 1134b, so that the first moving member 113 moves along the direction D1 to the releasing position.

In the embodiment, the connecting base 110 further includes a first elastic member 117 disposed between a pillar 119 of the housing 111 and the main body 1132 of the first moving member 113. One end of the first elastic member 117 is disposed at the pillar 119 of the housing 111, and the other end of the first elastic member 117 is disposed at the main body 1132 of the first moving member 113, so as to generate an elastic force when the first moving member 113 is located at the releasing position for the first moving member 113 to reset to the buckling position. When the electronic device 20 pushes the hook 1134 along the inclined surface 1134b, the first moving member 113 moves along the direction D1 to the releasing position, and the first elastic member 117 is elongated. Therefore, the elastic potential energy of the first elastic member 117 when the hook 1134 is located at the releasing position is greater than the elastic potential energy when the hook 1134 is located at the buckling position.

Since the first elastic member 117 accumulates greater elastic potential energy when the hook 1134 is located at the releasing position, when the hook 1134 passes through the hook groove 22 of the electronic device 20 and is no longer pushed by the electronic device 20, the first elastic member 117 releases the accumulated elastic potential energy to bring the hook 1134 back to the buckling position. At this time, the electronic device 20 is engaged with the extension device 100.

When the user intends to separate the electronic device 20 from the extension device 100, the user pushes the toggle 112 along the direction D1, and the toggle 112 drives the main body 1132 of the first moving member 113, so that the first moving member 113 moves along the direction D1. The first moving member 113 moves to the releasing position. At this time, the hook 1134 is not engaged with the hook groove 22 of the electronic device 20, and the electronic device 20 is adapted to be pulled upward and separated from the extension device 100. In addition, when the user releases the toggle 112 and the hook 1134 is not subjected to an external force, the first elastic member 117 resets the hook 1134 to the buckling position.

Figure 5:
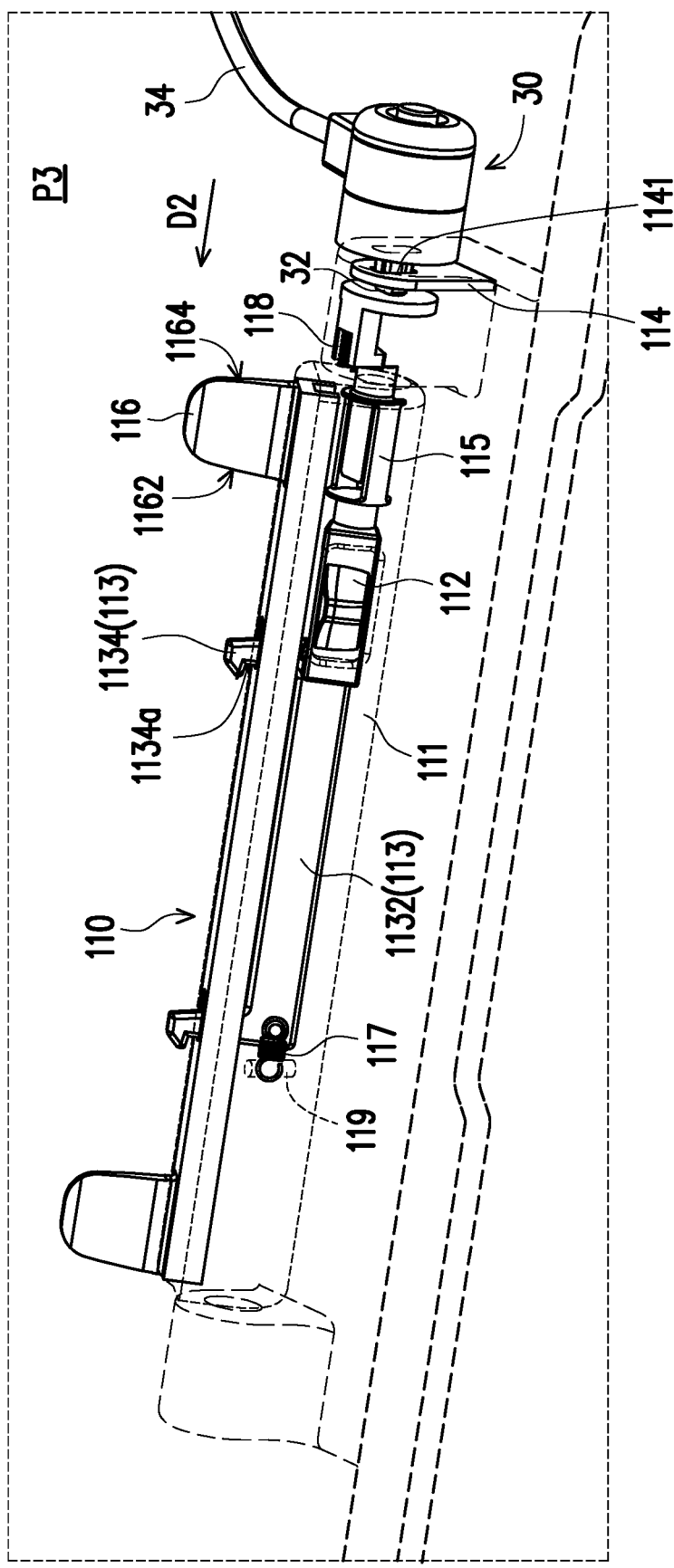
FIG. 5 is a partial schematic view of the extension device of FIG. 1 in a third position.

FIG. 5 is a partial schematic view of the extension device of FIG. 1 in a third position. Please refer to FIG. 2 and FIG. 5. In the embodiment, the anti-theft lock assembly 30 is, for example, a Kensington Lock, which is a commonly used anti-theft lock assembly for anti-theft of electronic products in shopping malls. In other words, the disclosure can achieve the objective of locking the electronic device 20 and the extension device 100 at the same time by using a conventional anti-theft lock assembly.

The anti-theft lock assembly 30 has a cable 34. The cable 34 may be connected to or wound around an object that may not be moved easily to prevent the object locked by the anti-theft lock assembly 30 from being stolen. The lock hole 1141 of the fixed member 114 is elongated. One end of the anti-theft lock assembly 30 is provided with an elongated locking member 32. The locking member 32 is adapted to be aligned with the lock hole 1141 to pass through the fixed member 114.

The anti-theft lock assembly 30 is detachably disposed at one side of the fixed member 114 opposite to the second moving member 115. In the case where the electronic device 20 is engaged with the extension device 100, and the hook 1134 is located at the buckling position, when the user intends to limit the electronic device 20 to the extension device 100, the locking member 32 is aligned with the shape of the lock hole 1141, the locking member 32 passes through the lock hole 1141 of the fixed member 114 and pushes against the second moving member 115 along an opposite direction D2, and the second moving member 115 moves along the opposite direction D2 and abuts against the main body 1132 to stop the first moving member 113 at the buckling position, as shown in a third position P3 of FIG. 5.

At this time, the user uses a key to rotate the locking member 32 by 90 degrees. After rotating the locking member 32, the locking member 32 displaces from the lock hole 1141. Therefore, the locking member 32 cannot be withdrawn from the lock hole 1141, so that the anti-theft lock assembly 30 is fixed onto the fixed member 114. In this case, the locking member 32 abuts against the second moving member 115, and the second moving member 115 abuts against the main body 1132 to limit the main body 1132 to move along the direction D1. Therefore, the main body 1132 cannot drive the first moving member 113 to slide along the direction D1, but stops the first moving member 113 at the buckling position. At this time, the electronic device 20 cannot be separated from the extension device 100, and the anti-theft lock assembly 30 must lock the electronic device 20 and the extension device 100 at the same time.

In addition, the connecting base 110 further includes a second elastic member 118 disposed between the housing 111 and the second moving member 115. One end of the second elastic member 118 is disposed at the housing 111, and the other end of the second elastic member 118 is disposed at the second moving member 115. The second elastic member 118 provides an elastic potential energy for the second moving member 115 to reset when the second moving member 115 is pushed to the first moving member 113. That is, the elastic potential energy of the second elastic member 118 when the second moving member 115 is pushed to the main body 1132 is greater than the elastic potential energy when the second moving member 115 is not yet pushed to the main body 1132.

When the locking of the electronic device 20 and the extension device 100 by the anti-theft lock assembly 30 is to be dismissed, the key is used to rotate the locking member 32 by 90 degrees, so that the locking member 32 is aligned with the lock hole 1141 to be withdrawn from the fixed member 114. The locking member 32 no longer abuts against the second moving member 115.

Since the elastic potential energy of the second elastic member 118 when the second moving member 115 is pushed to the main body 1132 is greater than the elastic potential energy when the second moving member 115 is not yet pushed to the main body 1132, when the second moving member 115 is no longer pushed against by the locking member 32, the second elastic member 118 resets the second moving member 115, that is, the second elastic member 118 pulls the second moving member 115 along the direction D1 back to the position where the second moving member 115 is located in the first position P1 shown in FIG. 3. At this time, the second moving member 115 no longer abuts against the toggle 112, and the user may move the toggle 112 along the direction D1, thereby driving the first moving member 113 to slide along the direction D1 to dismiss the engagement between the hook 1134 and the hook groove 22. The extension device 100 may be pulled upward to break away from the electronic device 20.

In summary, in the extension device of the disclosure, when the anti-theft lock assembly is not locked, the hook is located at the buckling position. There is the gap between the second moving member and the main body. The main body drives the hook to be adapted to move along the direction toward the second moving member, so that the first moving member moves to the releasing position. At this time, the electronic device may be separated from the extension device. When the anti-theft lock assembly passes through the lock hole of the fixed member and pushes against the second moving member, the second moving member abuts against the main body to stop the first moving member at the buckling position. In this way, the anti-theft lock assembly can limit the separation of the extension device and the electronic device, thereby implementing the anti-theft of the extension device and the electronic device at the same time in the case where only one anti-theft lock assembly is used.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. An extension device, comprising:
   a connecting base, comprising:
      a housing;
      a first moving member, disposed at the housing and capable of moving back and forth along a direction to be located at a buckling position or a releasing position;
      a fixed member, disposed at one side of the housing and comprising a lock hole; and
      a second moving member, movably disposed between the first moving member and the fixed member; and
   an anti-theft lock assembly, detachably disposed at one side of the fixed member opposite to the second moving member and adapted to pass through the lock hole of the fixed member and push against the second moving member, so that the second moving member moves towards and abuts against the first moving member to stop the first moving member at the buckling position,
   the first moving member comprises a main body and a hook extending from the main body, when the first moving member is located at the buckling position, a gap is presented between the second moving member and the main body.

2. The extension device according to claim 1, wherein the connecting base further comprises:
   a first elastic member, wherein one end of the first elastic member is disposed at the housing, and other end of the first elastic member is disposed at the first moving member, so as to generate an elastic force when the first moving member is located at the releasing position for the first moving member to reset to the buckling position.

3. The extension device according to claim 1, wherein the connecting base further comprises:
   a second elastic member, wherein one end of the second elastic member is disposed at the housing, other end of the second elastic member is disposed at the second moving member, and the second elastic member provides an elastic potential energy for the second moving member to reset when the second moving member is pushed to the first moving member.

4. The extension device according to claim 1, wherein the hook is exposed outside the housing and comprises a first limiting surface, and the connecting base further comprises:
   a positioning member, protruding from the housing and comprising a second limiting surface and a third limiting surface opposite to each other, wherein a normal direction of the second limiting surface and the third limiting surface is different from a normal direction of the first limiting surface.

5. The extension device according to claim 4, wherein a top portion of the hook comprises an inclined surface.

6. The extension device according to claim 1, wherein one end of the anti-theft lock assembly comprises a locking member, and the locking member is adapted to pass through the fixed member in a shape aligned with the lock hole and then rotate by an angle to displace from the lock hole to be fixed to the fixed member.

7. The extension device according to claim 1, wherein the hook is exposed outside the housing, when the first moving member is located at the buckling position, the main body drives the hook to be adapted to move along the direction toward the second moving member, so that the first moving member moves to the releasing position, and when the first moving member is located at the buckling position, the anti-theft lock assembly passes through the lock hole of the fixed member and pushes against the second moving member, so that the second moving member abuts against the main body to stop the first moving member at the buckling position.

8. An electronic system, comprising:
   an electronic device, comprising a buckle groove; and
   an extension device, comprising:
      a connecting base, comprising:
         a housing;
         a first moving member, disposed at the housing, capable of moving back and forth along a direction to be located at a buckling position or a releasing position, and comprising a main body and a hook extending from the main body and exposed outside the housing, wherein the hook is disposed corresponding to the buckle groove of the electronic device, so that the electronic device is assembled to the connecting base by the buckle groove engaged with the hook;
         a fixed member, disposed at one side of the housing and comprising a lock hole; and
         a second moving member, movably disposed between the main body and the fixed member; and
      an anti-theft lock assembly, detachably disposed at one side of the fixed member opposite to the second moving member, wherein when the electronic device is assembled to the connecting base and the hook is located at the buckling position, the anti-theft lock assembly is adapted to pass through the lock hole of the fixed member and push against the second moving member, so that the second moving member moves towards and abuts against the main body to stop the first moving member at the buckling position,
   when the first moving member is located at the buckling position, a gap is presented between the second moving member and the main body.

9. The electronic system according to claim 8, wherein the connecting base further comprises:
   a first elastic member, wherein one end of the first elastic member is disposed at the housing, and other end of the first elastic member is disposed at the first moving member, so as to generate an elastic force when the first moving member is located at the releasing position for the first moving member to reset to the buckling position.

10. The electronic system according to claim 8, wherein the connecting base further comprises:
- a second elastic member, wherein one end of the second elastic member is disposed at the housing, other end of the second elastic member is disposed at the second moving member, and the second elastic member provides an elastic potential energy for the second moving member to reset when the second moving member is pushed to the first moving member.

11. The electronic system according to claim 8, wherein the hook comprises a first limiting surface, the electronic device further comprises a positioning hole, and the connecting base further comprises:
- a positioning member, protruding from the housing, wherein when the electronic device is close to the connecting base, the positioning member extends into the positioning hole of the electronic device, the positioning member comprises a second limiting surface and a third limiting surface opposite to each other, and a normal direction of the second limiting surface and the third limiting surface is different from a normal direction of the first limiting surface.

12. The electronic system according to claim 8, wherein a top portion of the hook comprises an inclined surface, and when the electronic device is close to the connecting base, the electronic device pushes against the hook along the inclined surface, so that the first moving member moves.

13. The electronic system according to claim 8, wherein one end of the anti-theft lock assembly comprises a locking member, and the locking member is adapted to pass through the fixed member in a shape aligned with the lock hole and then rotate by an angle to displace from the lock hole to be fixed to the fixed member.

14. The electronic system according to claim 8, wherein when the electronic device is assembled to the connecting base and the hook is located at the buckling position, the main body drives the hook to be adapted to move along the direction toward the second moving member, so that the first moving member moves to the releasing position, and when the electronic device is assembled to the connecting base and the hook is located at the buckling position, the anti-theft lock assembly passes through the lock hole of the fixed member and pushes against the second moving member, so that the second moving member abuts against the main body to stop the first moving member at the buckling position.

* * * * *